United States Patent Office 3,657,286
Patented Apr. 18, 1972

3,657,286
PREPARATION OF A WATER SOLUBLE BISULFITE DERIVATIVE OF MENADIONE
William Richard Micheli, Gurnee, Ill., assignor to Abbott Laboratories, Chicago, Ill.
No Drawing. Filed Nov. 23, 1970, Ser. No. 92,300
Int. Cl. C07c 49/66
U.S. Cl. 260—396 K     4 Claims

ABSTRACT OF THE DISCLOSURE

It has been found that by using the proper reaction medium the bisulfite addition product of menadione can be obtained in greater purity, quantitative yield and by a simpler recovery step. The medium used consists of a combination of water and carbon tetrachloride.

DETAILED DESCRIPTION OF THE INVENTION

The bisulfite addition product of menadione has long been used for various pharmaceutical utilities and as an additive for animal feed. The technology known to date, however, required pure starting materials, pure intermediates or several intermediate steps in order to obtain pharmaceutical grade preparations of the above adduct which is referred to hereinafter as vitamin K. Some of the steps necessary from the known literature are cumbersome and expensive or, they provide only an impure material or a relatively low yield.

It is therefore an object of the present invention to produce vitamin K in substantially quantitative yield; it is a further object of this invention to produce pure vitamin K in a simple procedure; it is still another object of this invention to provide a method for a one step preparation of vitamin K producing the latter in excellent yield and pharmaceutical purity.

These and other objects are accomplished by the method of preparing the water soluble sodium bisulfite adduct of menadione by converting menadione to said bisulfite adduct in a medium consisting of 12–14.5 parts of carbon tetrachloride and 1.5–5 parts of water per part of menadione, separating the carbon tetrachloride solution from the aqueous layer after complete conversion to said bisulfite adduct, and isolating said bisulfite adduct from the aqueous layer. The bisulfite adduct is ordinarily formed using sodium bisulfite which can be added conveniently as an aqueous solution but, if preferred, gaseous sulfur dioxide may be used while sodium hydroxide is added to the reaction solvent. The amount of the sodium bisulfite added is easily calculated from the amount of menadione in the starting solution in order to form the adduct with the desired proportion of free bisulfite content. The amount of anhydrous sodium bisulfite used ordinarily is about the same as the amount of menadione present on a net weight basis but may be 10–50% higher, depending on the amount of free bisulfite desired in the end product. The addition reaction is almost instantaneous and quantative yields are obtained at room temperature but, to assure intimate contact between the co-reactants, the mixture is preferably agitated and heated to a temperature between 30–60° C.

A significant advantage of the present invention is the fact that the menadione used does not have to be of outstanding purity in order to produce a pure bisulfite additive, in fact, a very convenient method of producnig the bisulfite adduct of menadione by the present method consist in reacting β-methylnaphthalene with chromic acid in the presence of acetic acid, using carbon tetrachloride as the reaction medium, filtering insoluble particles from the reaction solution and adding the calculated amount of sodium bisulfite to produce the desired excess of free bisulfite and sufficient water to satisfy the above requirement. The crude carbon tetrachloride solution of menadione obtained in the described manner is of sufficient purity to be directly converted to the bisulfite adduct and produces a satisfactory purity grade of the desired material by the present process.

The amount of water used in the reaction mixture for the present process is critical within the above limits: when the amount of water is below 1.5 parts per part of menadione, the vitamin K solution is too concentrated and starts to crystallize or precipitate, making it impossible to produce a clear phase separation; when the amount of water is greater than 5 parts, the ensuing solution of vitamin K is too dilute and not suitable for quick, practical and quantitative recovery of vitamin K.

In a particularly useful embodiment of the present method, the aqueous vitamin K solution obtained in this manner is worked up simply by the addition of isopropanol which precipitates the formed vitamin K. Another even more practical method involves simple spray-drying of the aqueous vitamin K solution. In case of isopropanol precipitation, it is important that minimal amounts of water are used throughout the preparative steps since otherwise the cost of recovery through this method becomes much higher.

In order to illustrate the process of the present invention, reference is made to the following examples which, however, are not meant to limit this invention in any respect.

EXAMPLE 1

A solution of 7.5 kg. of menadione in 102 kg. of carbon tetrachloride is heated to 45° C. in a glass reactor. Nitrogen is bubbled through the solvent for 15 minutes and subsequently, 8.74 kg. of sodium metabisulfite is added. The solvent is stirred for a period of 2½ hours while adding 16.65 liters of water at 25–30° C. Stirring is continued for another two hours at room temperature and at 55° C. for 30 minutes. After settling, the bottom phase is separated and to the aqueous layer containing the vitamin K is added 78 kg. of anhydrous isopropanol. The solution is stirred at room temperature for two hours and filtered. The precipitate is vacuum dried at 50° C. to yield 150 kg. of vitamin K containing 33% by weight of free sodium bisulfite.

EXAMPLE 2

To a solution of 1335 pounds of chromic acid in 178 gallons of water is added 100 gallons of carbon tetrachloride under agitation. To this mixture is added a solution of 420 pounds of β-methylnaphthalene in 1270 pounds of glacial acetic acid in such a manner that the temperature does not rise above 60° C. When oxidation is complete, 150 gallons of carbon tetrachloride are added and the temperature is held for 7 hours at 70–72° C. Subsequently, 400 gallons of water are added, the mixture is stirred for another 15 minutes and allowed to separate into its phases. The aqueous phase is separated, extracted twice with 25 gallons each of carbon tetrachloride and these organic solutions are combined with the previous carbon tetrachloride solution. The combined carbon tetrachloride solution is washed with 100 gallons of water at 50° C. and the separated organic phase is filtered at 40–50° C. with the help of 5 pounds of a filter-aid. The filter cake is washed with 25 gallons of carbon tetrachloride which is combined with the main batch of menadione and cooled to 30° C., at which point 300 pounds of sodium bisulfite are added to the solution under stirring followed by the addition of 477 pounds of water over a period of 2½ hours. The mixture is stirred for another 2 hours at 25–30° C., heated to 55–60° C. under stirring for 10 to 15 minutes after which time the phases are allowed to separate at room temperature. The carbon tetrachloride phase is separated and the aqueous phase is filtered and spray-dried in a conventional spray-drier using an inlet temperature of 200–500° C., an outlet temperature of 150–200° C., with the gas regulator set at 400–475° C. The dried, water soluble vitamin K obtained in this fashion is a yellowish powder with a vitamin K content of 60.2% and a free bisulfite content of 30% on a weight base. The total amount of this pharmaceutically acceptable mixture is 650 pounds. The carbon tetrachloride separated above is recycled for use in a subsequent batch.

In such a subsequent batch (same amounts), the aqueous solution is worked up by the addition of 550 gallons of filtered isopropanol under stirring, cooling to room temperature for at least 1 hour and centrifuging the obtained precipitate. The crude material is subsequently washed with isopropanol and vacuum dried at 35° C., for 3 hours and at 50° C., for 24 hours. The yield obtained in this manner amounts to about 500 pounds which requires hammer-milling for a suitable particle size product.

When the amount of water in the above example is increased to 1500 pounds, essentially the same result is obtained by the spray-drying method, while the isopropanol precipitation route furnishes a somewhat lower yield in the first crop.

As will be seen from the above examples, excellent yields of vitamin K are obtained in a simple procedure, directly using the reaction mixture obtained in the oxidation step for β-methylnaphthalene. It is shown that no intermediate needs to be isolated which eliminates a major manipulation and equipment tie-up needed by all vitamin K preparation routes previously known. Also, the present procedure directly furnishes an aqueous solution of vitamin K which can be worked up by simple spray-drying, resulting in a powdered product of excellent water solubility, requiring no further hammer-milling, mixing, blending, etc. With proper selection of the amount of bisulfite added to the reaction mixture, vitamin K can be obtained directly in the required strength prescribed by the U.S. Pharmacopeia, or other specifications.

I claim:

1. The method of preparing the water soluble sodium bisulfite adduct of menadione consisting essentially in reacting menadione with sodium bisulfite in a medium consisting of 12 to 14.5 parts by weight of carbon tetrachloride and 1.5 to 5 parts of water per part by weight of menadione, separating the carbon tetrachloride solution from the aqueous layer after conversion of said menadione to said bisulfite adduct, and isolating said bisulfite adduct from the aqueous layer.

2. The process of claim 1 wherein the amount of sodium bisulfite is in a 10–50% excess over the molar equivalent of said menadione.

3. The process of claim 1 wherein said bisulfite adduct is isolated from the obtained aqueous layer by spray-drying.

4. The process of claim 1 wherein said bisulfite adduct is isolated from said aqueous layer by precipitation with isopropanol.

References Cited

UNITED STATES PATENTS

| | | | |
|---|---|---|---|
| 2,331,808 | 10/1943 | Shelton et al. | 260—396 |
| 3,079,405 | 2/1963 | Galler | 260—396 |
| 3,408,368 | 10/1968 | Pomote | 260—396 |

JAMES A. PATTEN, Primary Examiner

V. GARNER, Assistant Examiner